United States Patent [19]

Miyazaki

[11] Patent Number: 5,787,567
[45] Date of Patent: Aug. 4, 1998

[54] COIL-FORMING WIRE MATERIAL AND METHOD OF MANUFACTURING SUCH MATERIAL

[75] Inventor: Hiroshi Miyazaki, Toyota, Japan

[73] Assignee: Toyota Jidosha Kabushiki Kaisha, Toyota, Japan

[21] Appl. No.: 593,973

[22] Filed: Jan. 30, 1996

[30] Foreign Application Priority Data

Feb. 17, 1995 [JP] Japan .................................. 7-029755

[51] Int. Cl.$^6$ .................................................. H02K 15/02
[52] U.S. Cl. ................................. 29/596; 29/598; 29/608
[58] Field of Search ........................... 29/596, 598, 608; 310/180, 201, 208

[56] References Cited

U.S. PATENT DOCUMENTS

| | | |
|---|---|---|
| 4,635,350 | 1/1987 | Olsen et al. |
| 5,664,317 | 9/1997 | Ponzio et al. ............................ 29/596 |
| 5,680,592 | 10/1997 | Kilman et al. ............................ 29/596 |

FOREIGN PATENT DOCUMENTS

| | | |
|---|---|---|
| 1 489 900 | 11/1970 | Germany. |
| 63-194543 | 8/1988 | Japan. |

*Primary Examiner*—W. Donald Bray
*Attorney, Agent, or Firm*—Oblon, Spivak, McClelland, Maier & Neustadt, P.C.

[57] ABSTRACT

A coil-forming wire material which can be efficiently arranged in slots of a motor core so as to down-size coil ends, thereby making the coil and a motor compact. The coil-forming wire material comprises a plurality of flexible thin wires. The thin wires are stuck at given portions such that they have a predetermined cross sectional shape. The stuck portions serve as rigid portions, i.e. coil sides. The coil-forming wire material also has flexible connecting portions where the wires are loose. The coil-forming wire material has the flexible connecting portions and the rigid portions which are arranged in an alternate manner. The flexible connecting portions serve as coil ends. The coil ends extend from the core with a small curvature due to the flexibility thereof.

3 Claims, 4 Drawing Sheets

COIL-FORMING WIRE MATERIAL AND METHOD OF MANUFACTURING SUCH MATERIAL

BACKGROUND OF THE INVENTION

1. Field of the Invention

This invention relates to a coil-forming wire material which is continuously wound around a motor core through a plurality of slots thereon and a method of manufacturing such a coil-forming wire material.

2. Description of the Related Art

In a motor, a stator generally comprises a core 102 and an enamel-insulated coil-forming wire material 101 (called "wire material 101") wound around the core 102 as shown in FIG. 1 of the accompanying drawings. Referring to FIG. 2, the core 102 is made of a plurality of laminated annular metal plates 102a. Further, the core 102 has a plurality of axially formed slots 103 on its inner surface. The wire material 101 is wound around the core 102 through optional slots, thereby forming a coil.

When current is applied to the wire material 101, a magnetic flux is generated through the coil, so a motor is driven. In the coil, a portion of the wire material 101 passing through the slot 103 is called "a coil side 101a" while a portion of the wire material connecting coil sides 101a is called "a coil end 101b".

In the motor using such a stator, it is required to effectively arrange the wire material in the slots so as to enable the motor to produce a high output and to be made compact. To meet such a demand, proposals have been made to cause a wire material to have a rectangular cross section instead of a conventional circular cross section such that adjacent turns of the wire material can be in close contact with one another at flat portions thereof. This can reduce spaces present between the adjacent turns of the wire material, and enables the wire material be efficiently arranged in the slots. However, such a rectangular wire material tends to become more rigid, which means that a coil end would have a large curvature, and project extensively from the stator core. Thus, the coil itself would become larger, enlarging a motor as a whole. Further, a greater force is required to wind the wire material around the core, which would lengthen the time taken to manufacture coils.

In another motor, it has been proposed to flatten a wire material at coil sides thereof passing through slots. The flat portions of the wire material can be efficiently and closely arranged in the slots. However, there is a difference of height at a border between the flattened and non-flattened portions of the wire material. In order to arrange the flattened portions tightly in the slots, it is necessary that such a border should be far from ends of the slots. This means that the coil ends extensively project from the stator core, enlarging the motor as well as the coil.

SUMMARY OF THE INVENTION

It is an object of the invention to provide a coil-forming wire material which can overcome the foregoing problems of conventional coil-forming wire materials, and can be efficiently arranged in slots of a motor core with coil ends projecting from the slots as little as possible, thereby offering a compact motor.

In accordance with a first aspect of the invention, there is provided a coil-forming wire material to be continuously wound around a core of a motor through slots on the core. The coil-forming wire material comprises a plurality of wires which have a plurality of loosely bound portions to extend from the slots and serve as coil ends, and a plurality of rigid portions stuck together into a predetermined cross sectional shape, and are to be arranged in the slots and serve as coil sides.

In this arrangement, the rigid portions have a certain level of rigidity and can be densely and efficiently arranged in the slots. The thin wires as the coil ends projecting from the slots are flexible and loosely bound, so they can be easily curved in accordance with a shape of the core without extensively projecting from the core. This is effective in making a motor compact.

The rigid portions have a rectangular cross section, which enables the wire material to be densely arranged in the slots with its wide surfaces facing one another. This is effective in increasing an output of the motor and down-sizing the motor.

The rigid portions are constituted by a plurality of stacked prismatic thin wires, which can be densely arranged in the slots, enabling the motor to produce a high output.

The rigid portions may be constituted by a plurality of stacked flat wires, which can be arranged in the slot so as to increase the motor output.

According to a second aspect of the invention, there is provided a coil-forming wire material comprising a single wire which has a predetermined cross section and includes rigid portions to be arranged in the slots and which serve as coil sides, and a plurality of connecting portions made of a plurality of thin members, connecting the rigid portions and serving as coil ends projecting from the slots.

In this arrangement, the rigid portions are made of a single wire, which can be efficiently arranged in the slots. Further, the rigid portions are joined by the connecting portions made of a plurality of thin members, which are flexible enough to be curved in accordance with the shape of the core. Thus, the connecting portions do not extensively project from the core, which is effective in making the motor compact.

The rigid portions have a rectangular cross section, and can be efficiently arranged in the slots with their wide surfaces facing one another, enabling the motor to produce a high output and be made compact.

The connecting portions are formed by partially dividing the single wire into a plurality of threads. Since the single wire is processed so as to have the rigid portions and the connecting portions. The rigid portions can be efficiently arranged in the slots, and the flexible connecting portions do not extensively project from the core, which can down-size not only the coil but also the motor.

The connecting portions are joined to the single wire. The rigid portions and the connecting portions can be easily formed. Further, the rigid portions made of the single wire can be efficiently arranged in the slots, and the flexible connecting portions do not extensively project from the core, which can down-size not only the coil but also the motor.

According to a third aspect of the invention, there is provided a method of manufacturing a coil-forming wire material to be continuously wound around a core of a motor through slots of the core. The method comprises the steps of applying an adhesive on surfaces of thin wires, loosely binding the thin wires, and sticking the loosely bound thin wires together at predetermined positions thereof into a predetermined cross sectional shape and forming rigid portions to be arranged in the slots of the core.

This method is effective in manufacturing the coil-forming wire material including rigid portions which can be efficiently arranged in the slots. The rigid portions can have a certain level of rigidity. The flexible connecting portions can be easily wound around the core. Thus, this method is effective in manufacturing the coil-forming wire material which can be wound around the core without difficulty.

In a fourth aspect of the invention, there is provided a method of manufacturing a coil-forming wire material, which comprises the steps of forming rigid portions in at least a single wire, the rigid portions to be arranged in slots and serving as coil sides, and joining a plurality of thin wires to the rigid portions.

This method is also effective in manufacturing the coil-forming wire material including rigid portions which can be efficiently arranged in the slots. The rigid portions can have a certain level of rigidity. The flexible connecting portions can be easily wound around the core. Thus, this method is effective in manufacturing the coil-forming wire material which can be wound around the core without difficulty.

According to a final aspect of the invention, there is provided a method of manufacturing a coil-forming wire material, which comprises the steps of forming rigid portions in a single wire, the rigid portions to be arranged in slots and serving as coil sides, rolling and flattening portions of the single wire between the rigid portions, and cutting the flattened portions into a plurality of threads and forming connecting portions as coil ends extending from the slots.

This method is also effective in manufacturing the coil-forming wire material having the rigid portions which can be efficiently arranged in the slots and the flexible connecting portions. The wire material can be easily wound around the core of the motor.

BRIEF DESCRIPTION OF THE DRAWINGS

Embodiments of the invention will now be described, by way of example, with reference to the accompanying drawings in which.

DESCRIPTION OF THE PREFERRED EMBODIMENTS

Figure 1:
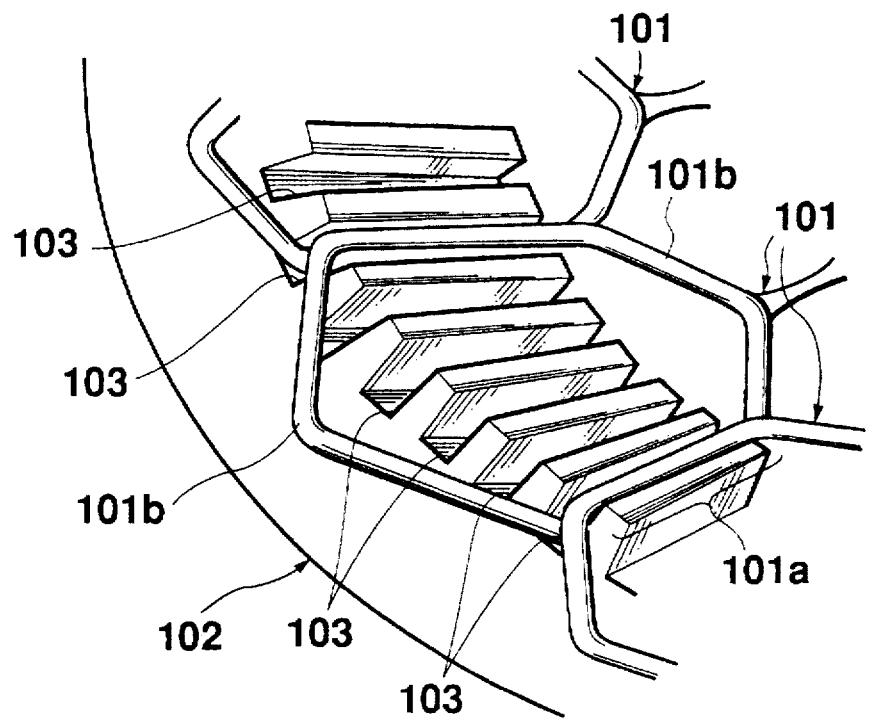
FIG. 1 is a schematic view of a conventional coil-forming wire material wound around a stator core of a motor.
Figure 2:
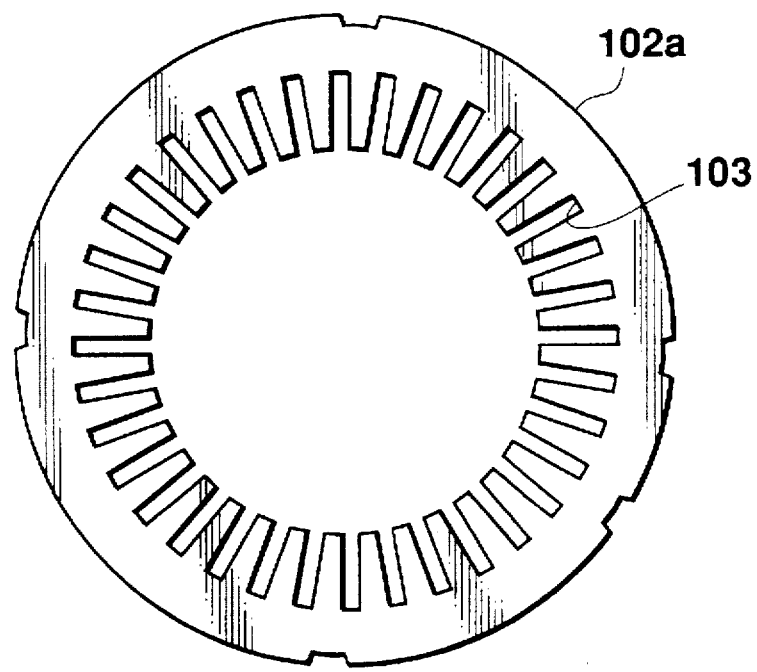
FIG. 2 is a top view of the stator core.
Figure 3:
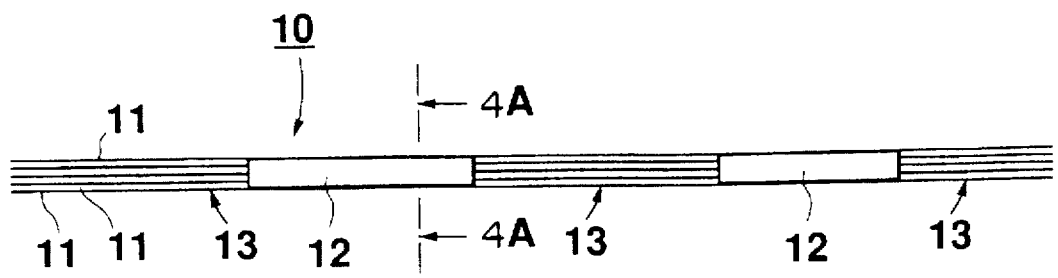
FIG. 3 shows an external appearance of a coil-forming wire material according to a first embodiment of the invention.

A coil-forming wire material 10 (called "wire material 10") according to a first embodiment will be described with reference to the drawings. Referring to FIG. 3, the wire material 10 comprises a plurality of enamel-insulated flexible thin wires 11 (called "thin wires 11"). The wire material 10 has not only a number of rigid portions 12 in which the thin wires 11 are stuck together in the shape of a rectangle but also a number of flexible portions 13 where the thin wires 11 are loose. In other words, the wire material 10 has the rigid portions 12 and flexible portions 13 arranged alternately. When repeatedly wound around a stator core 102, the wire material 10 is received in slots 103 (shown in FIGS. 1 and 2) at the rigid portions 12. The rigid portions 12 serve as coil sides.

This configuration enables the rigid portions 12 of the wire material 10 to be tightly and efficiently arranged in the slots 103 with flat surfaces thereof contacting with one another and with reduced spaces therebetween. Further, the flexible connecting portions 13 allow a small curvature because of the flexibility thereof, and project from the slots 103 as moderately as possible. This means that the coil can be made compact, and the motor can be down-sized as a whole.

Figure 4A:
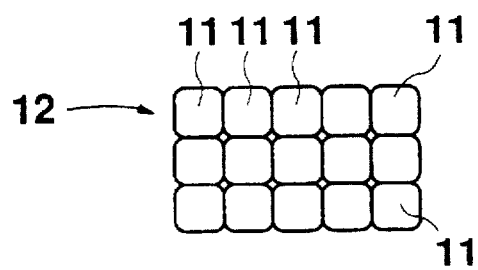
FIG. 4A is a cross section, taken along line A—A in FIG. 3, of an example of the coil-forming wire material which includes a plurality of prismatic thin wires having a rectangular cross section.
Figure 4B:
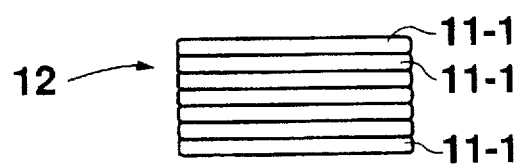
FIG. 4B is a cross section, taken along line A—A in FIG. 3, of another example of the coil-forming wire material which includes a plurality of flat thin wires.

Referring to FIG. 4A, the thin wires 11 having a rectangular cross section are orderly arranged so as to form the rigid portions 12. FIG. 4B shows that flat thin wires 11-1 are stacked so as to form the rigid portions 12.

Figure 5A:
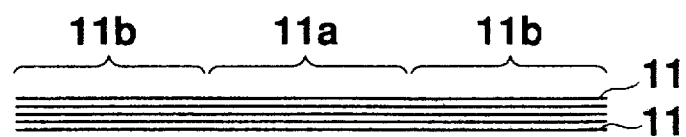
FIG. 5A is a schematic view showing a method of manufacturing the coil-forming wire material in the first embodiment, specifically showing how the coil-forming wire material is marked out into rigid portions to be arranged in slots of a motor core and flexible connecting portions for the rigid portions and extending from the slots.
Figure 5B:
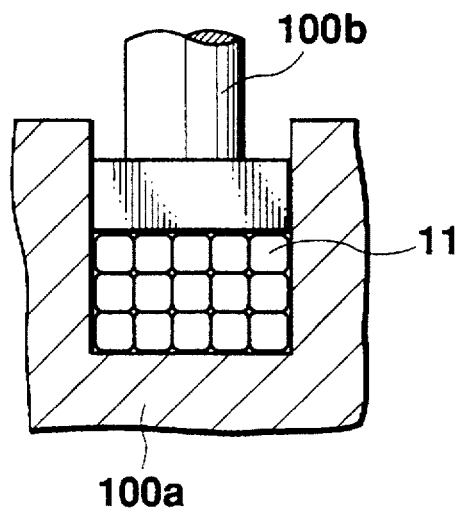
FIG. 5B schematically shows how the thin wires are stuck together at a rigid portion thereof.
Figure 5C:
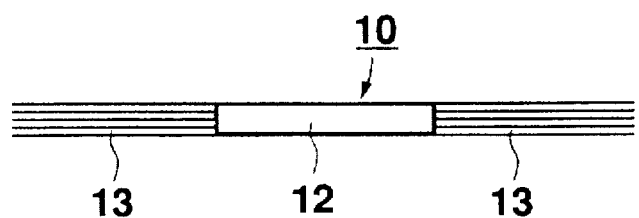
FIG. 5C shows an external view of the coil-forming wire material in its completed state.

A method of manufacturing the wire material 10 will be described with reference to FIGS. 5A, 5B and 5C. First of all, a plurality of (e.g. 15) enamel-insulated thin wires 11 are provided. In this case, the thin wires 11 are coated with an adhesive beforehand. As shown in FIG. 5A, the thin wires 11 are loosely bound, and are marked out into sections 11a and 11b which function as the rigid portions 12 and flexible connecting portions 13, respectively. At each section 11a (i.e. the rigid portion 12), the thin wires 11 are orderly arranged in five columns and three rows in a molding block 100a in the shape of a trough, and are then pressed downward by a molding block 100b engageable with the molding block 100a. The section 11a is heated while it is being pressed. When the adhesive is melted and then becomes solid, the section 11a is transformed into the rigid portion 12 having the rectangular cross section as shown in FIG. 5C. The foregoing process is repeated for all of the sections 11a of the thin wires 11 so as to obtain the coil-forming wire material 10 of a desired length. Alternatively, the thin wires 11 may be stuck together by resin or welded, instead of being stuck by the adhesive.

It is also possible to use a wire material 11 made of cylindrical thin wires instead of the foregoing wire material 11 made of prismatic thin wires. In such a case, it is preferable to heat the cylindrical thin wires and crimp them by applying a high pressure so as to firmly pack them when making rigid portions.

Figure 6:
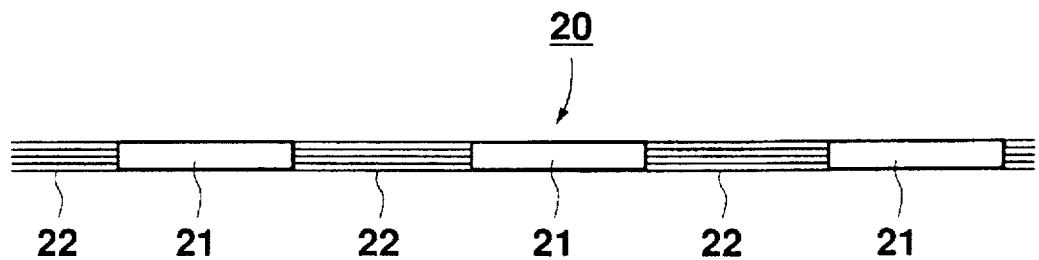
FIG. 6 is an external view of a coil-forming wire material according to a second embodiment of the invention.

In a second embodiment shown in FIG. 6, a wire material 20 includes a number of rigid portions 21 and a number of flexible connecting portions 22, i.e. the rigid portions 21 and the flexible connecting portions 22 are alternately arranged.

Figure 7:
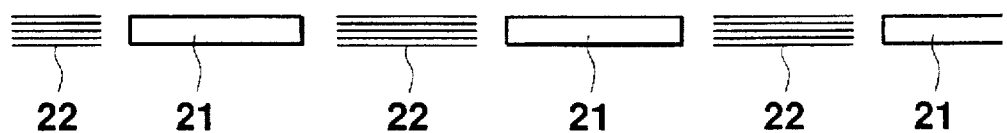
FIG. 7 schematically shows a method of manufacturing the coil-forming wire material of the second embodiment.

Each rigid portion 21 is a single enamel-insulated wire having a prismatic cross section, while each flexible portion 22 is made of a plurality of prismatic or cylindrical thin wires 11. The rigid portions 21 and the flexible connecting portions 22 are separate members as shown in FIG. 7, and are joined by welding or by crimping.

Similarly to the first embodiment, the wire material 20 is wound around a stator core with the rigid portions 21 passing through the slots. The rigid portions 21 are packed in the slots with reduced spaces therebetween.

However, when the flexible connecting portion 22 is made of cylindrical thin wires in a bundle of the same thickness as the rigid portions 21, the cross-sectional area of the flexible connecting portions 22 is less than that of the rigid portions 21, because of the spaces between the wires. It is therefore necessary to increase the cross-sectional area of the flexible connecting portions 22 until it equals that of the rigid portions 21. However, this causes the flexible connecting portions 22 to become bulkier than the rigid portions 21. If the flexible connecting portions 22 are longitudinally superimposed with respect to the rigid portions 21, it is impossible to keep the rigid portions 21 tightly stacked in the slot. Therefore, the cylindrical thin wires of the flexible connecting portions 22 are arranged in a flattened bundle, creating a roughly oval cross-section. When the wire material 20 is wound around the core, the rigid portions 21 are tightly stacked in the slots, and the flexible connecting portions 22 are no taller than the rigid portions 21, making it possible to avoid the problem of the coil end projecting out from the stator core.

When the wire material 20 is wound around the stator core, the flexible connecting portions 22 constitute coil ends. The flexible coil ends allow a small curvature, and do not project extensively, which reduces the sizes of a coil and a motor.

Figure 8A:
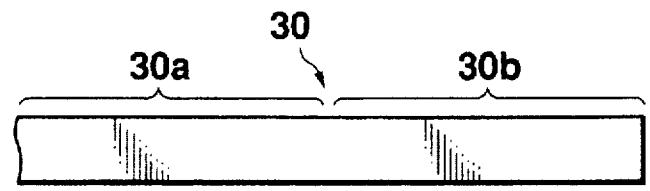
FIG. 8A schematically shows a coil-forming wire material before it is processed by another method of the second embodiment.
Figure 8B:
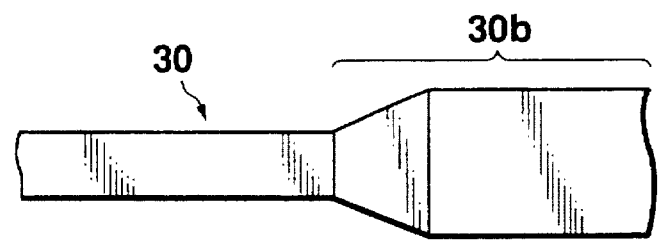
FIG. 8B shows that the coil-forming wire material is rolled and flattened so as to obtain a flexible connecting portion.
Figure 8C:
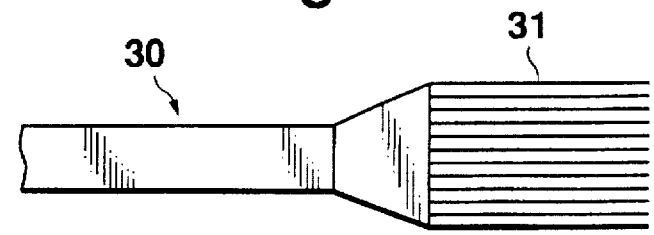
FIG. 8C shows that the flattened portion of the coil-forming wire material is cut into thin threads.

The wire material 20 of FIG. 6 is manufactured by another method shown in FIGS. 8A to 8C. In this case, a single enamel-insulated wire 30 is used, which has a rectangular cross section and is somewhat rigid. The wire material 30 is marked out into rigid portions 30a and flexible connecting portions 30b in accordance with positions of the slots of the stator core, as shown in FIG. 8A. Referring to FIG. 8B, the wire material 30 is rolled and flattened at the flexible connecting portions 30b. Thereafter, the flattened flexible connecting portions 30b are cut, by a laser beam machine or the like, into thin threads 31. The foregoing process is repeated for the remaining flexible connecting portions 30b, thereby obtaining the wire material 20 of a desired length.

The coil-forming wire materials according to the invention can be wound not only around the stator core of the motor but also around a rotor core of a motor having slots on its outer surface.

What is claimed is:

1. A coil-forming wire material to be continuously wound around a core of a motor through slots of the core, said coil-forming wire material comprising a single wire which has a predetermined cross section and includes rigid portions to be arranged in the slots and serving as coil sides, and a plurality of connecting portions which are made of a plurality of thin members, connect said rigid portions, and serve as coil ends projecting from the slots.

2. The coil-forming wire material as in claim 1, wherein said connecting portions are formed by partially dividing said single wire into a plurality of threads.

3. A method of manufacturing a coil-forming wire material to be continuously wound around a core of a motor through slots of the core, said method comprising the steps of:

(a) forming rigid portions in a single wire, said rigid portions to be arranged in slots and serving as coil sides;

(b) rolling and flattening portions of said single wire between said rigid portions; and (c) cutting said flattened portions into a plurality of threads and forming connecting portions as coil ends extending from the slots.

* * * * *